(12) United States Patent
Buford et al.

(10) Patent No.: US 9,799,004 B2
(45) Date of Patent: Oct. 24, 2017

(54) SYSTEM AND METHOD FOR MULTI-MODEL, CONTEXT-AWARE VISUALIZATION, NOTIFICATION, AGGREGATION AND FORMATION

(75) Inventors: John F. Buford, Princeton, NJ (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 436 days.

(21) Appl. No.: 13/606,900

(22) Filed: Sep. 7, 2012

(65) Prior Publication Data
US 2012/0331404 A1 Dec. 27, 2012

Related U.S. Application Data

(63) Continuation-in-part of application No. 12/848,009, filed on Jul. 30, 2010.

(51) Int. Cl.
*G06Q 10/10* (2012.01)
*G06F 17/30* (2006.01)

(52) U.S. Cl.
CPC .......... *G06Q 10/10* (2013.01); *G06Q 10/101* (2013.01); *G06F 17/30663* (2013.01)

(58) Field of Classification Search
CPC ... G06F 9/54; G06F 17/30663; G06Q 10/101; G06Q 10/10; H04L 51/04; H04L 12/1818; H04L 12/185; H04L 65/4015; H04N 21/4788
USPC ........................................................ 715/757
See application file for complete search history.

(56) References Cited

U.S. PATENT DOCUMENTS

| | | | |
|---|---|---|---|
| 6,522,347 B1* | 2/2003 | Tsuji | G06Q 30/02 345/419 |
| 7,373,424 B2 | 5/2008 | Surma et al. | |
| 8,166,184 B2 | 4/2012 | Ananthanarayanan et al. | |
| 8,631,351 B2* | 1/2014 | Fong | G06F 3/048 715/765 |
| 2002/0013759 A1 | 1/2002 | Stewart et al. | |
| 2003/0093478 A1 | 5/2003 | Hughes | |
| 2004/0205129 A1 | 10/2004 | Bongiorni et al. | |
| 2005/0060371 A1 | 3/2005 | Cohen et al. | |
| 2005/0065980 A1 | 3/2005 | Hyatt et al. | |
| 2005/0089023 A1 | 4/2005 | Barkley et al. | |
| 2005/0091435 A1 | 4/2005 | Han et al. | |
| 2005/0097440 A1* | 5/2005 | Lusk | G06Q 10/10 715/758 |

(Continued)

OTHER PUBLICATIONS

J. Rama, J. Bishop Survey and Comparison of CSCW Groupware Applications. Proceedings of SAICSIT 2006.

(Continued)

*Primary Examiner* — Sherrod Keaton
(74) *Attorney, Agent, or Firm* — Sheridan Ross P.C.

(57) ABSTRACT

Systems, methods, and non-transitory computer-readable storage media for context-aware visualization, notification, aggregation, and formation in a multi-model collaboration space. The system first finds contextually related content from a multi-model collaboration space, wherein the multi-model collaboration space includes disjoint collaboration tools. The system then generates a unified content view of the multi-model collaboration space, wherein the unified content view presents the contextually related content from the multi-model collaboration space.

20 Claims, 7 Drawing Sheets

(56) References Cited

U.S. PATENT DOCUMENTS

| | | | |
|---|---|---|---|
| 2006/0010240 A1* | 1/2006 | Chuah | G06Q 50/01 709/228 |
| 2006/0053194 A1 | 3/2006 | Schneider et al. | |
| 2006/0053195 A1 | 3/2006 | Schneider et al. | |
| 2006/0053196 A1 | 3/2006 | Spataro et al. | |
| 2006/0053380 A1 | 3/2006 | Spataro et al. | |
| 2006/0080432 A1 | 4/2006 | Spataro et al. | |
| 2006/0087987 A1 | 4/2006 | Witt et al. | |
| 2006/0117042 A1 | 6/2006 | Hu et al. | |
| 2006/0155785 A1 | 7/2006 | Berry et al. | |
| 2006/0271520 A1* | 11/2006 | Ragan | G06F 17/30663 |
| 2007/0106727 A1 | 5/2007 | Mainard | |
| 2007/0136423 A1 | 6/2007 | Gilmore et al. | |
| 2007/0150512 A1 | 6/2007 | Kong et al. | |
| 2007/0208806 A1 | 9/2007 | Mordecai et al. | |
| 2007/0233785 A1 | 10/2007 | Abraham et al. | |
| 2007/0239501 A1 | 10/2007 | Cunningham et al. | |
| 2007/0271340 A1 | 11/2007 | Goodman et al. | |
| 2007/0282657 A1 | 12/2007 | Hupfer et al. | |
| 2007/0294348 A1 | 12/2007 | Cohen et al. | |
| 2008/0072158 A1 | 3/2008 | Samele et al. | |
| 2008/0133736 A1 | 6/2008 | Wensley et al. | |
| 2008/0148146 A1 | 6/2008 | Estrada et al. | |
| 2008/0155471 A1 | 6/2008 | Lynn et al. | |
| 2008/0228774 A1 | 9/2008 | Hamilton et al. | |
| 2008/0320001 A1 | 12/2008 | Gaddam | |
| 2009/0013043 A1* | 1/2009 | Tan | G06Q 10/107 709/205 |
| 2009/0055475 A1 | 2/2009 | Sekaran et al. | |
| 2009/0094288 A1 | 4/2009 | Berry et al. | |
| 2009/0150968 A1 | 6/2009 | Ozzie et al. | |
| 2009/0234921 A1 | 9/2009 | Dudley | |
| 2009/0254843 A1 | 10/2009 | Van Wie et al. | |
| 2009/0300114 A1 | 12/2009 | King | |
| 2010/0017619 A1 | 1/2010 | Errico | |
| 2011/0320374 A1 | 12/2011 | Wang et al. | |
| 2012/0011205 A1 | 1/2012 | Paulsami et al. | |
| 2012/0260195 A1 | 10/2012 | Hon et al. | |

OTHER PUBLICATIONS

Google Wave. http://wave.google.com.
Microsoft Groove. http://connect.microsoft.com/groove.
Thinkature. http://thinkature.com.
SecondLife. www.secondlife.com.
Kaneva. www.kaneva.com.
There.com. www.there.com.
Betsy Book Moving Beyond the Game: Social Virtual Worlds, Virtual Economy Research Network, Unpublished manuscript, http://www.virtualworldsreview.com/papers/BBook\_SoP2.pdf.
Tolga K. Capin, Igor S. Pandzic, Nadia Magnenat-Thalmann, Daniel Thalmann, Avatars in Networked Virtual Environments, John Wiley & Sons, Inc., New York, 1999, ISBN: 0471988634. Book.
Wolfgang Broll, Bringing People Together—An Infrastructure for Shared Virtual Worlds on the Internet, WET-ICE '97. Proceedings 6th Workshop on Enabling Technologies on Infrastructure for Collaborative Enterprises, IEEE Computer Society, pp. 199-204.
C. Bouras and T. Tsiatsos, Distributed virtual reality: Building a multi-layer for the EVE platform, Journal of Network and Computer Applications, Apr. 2004, 27(2), 91-111.
Eva-Lotta Salinas. Collaboration in multi-modal virtual worlds: comparing touch, text, voice and video, The social life of avatars: presence and interaction in shared virtual environment, Springer Verlag, 2002, ISBN: 1-85233-461-4, pp. 172-187.
Vivox. http://www.vivox.com.
M. Weiss, B. Esfandiari, Y. Luo. Towards a classification of web service feature interactions. *Comput. Netw.* 51, 2 (Feb. 2007), 359-381. http://dx.doi.org/10.1016/j.comnet.2006.08.003.
M. Weiss, A. Oreshkin, B. Esfandiari. Method for detecting functional feature interactions of web services. Journal of Computer Systems Science and Engineering. V21 i4. 273-284, 2006.
M. Weiss, B. Esfandiari. On feature interactions among web services. Interl. Journal on Web Services Research. V2 i4. 21-45.
M. Weiss, A. Oreshkin, and B. Esfandiari, Invocation Order Matters: Functional Feature Interactions of Web Services. *Workshop on Engineering Service Compositions (WESC)*, 69-76, IBM, 2005.
X. Wu and V. Krishnaswamy, Widgetizing communication services, ICC 2010, Capetown, South Africa.
A.F. Layouni, L. Logrippo, K.J. Turner, Conflict Detection in Call Control Using First-Order Logic Model Checking, ICFI 2007, Sep. 3-5, 2007, Grenoble, France.
M. Kolberg and E.H. Magill. A pragmatic approach to Service Interaction Filtering between Call Control Services, *The International Journal on Computer Networks*, Elsevier Science, vol. 38, pp. 591-802, 2002.
M. Kolberg, J. Buford, K. Dhara, V. Krishnaswamy, X. Wu, V. Krishnaswamy, Handling Distributed Feature Interactions in Enterprise SIP Application Services. IEEE ICC 2009, Jun. 2009.
M. Caider, M. Kolberg, E.H. Magill and S. Reiff-Marganiec. Feature Interaction: A critical Review and Considered Forecast, Computer Networks J., vol. 41(1), 2003. pp. 115-141.
D.O. Keck and P.J. Kuehn. The Feature and Service Interaction Problem in Telecommunications Systems: A Survey, IEEE Transactions on Software Engineering, vol. 24(10), pp. 779-796.
E.J. Cameron, N.D. Griffeth, Y.J. Lin, M.E. Nilson, W.K. Schnure and H. Velthuijsen, *A feature interaction benchmark for IN and beyond*, Proceedings of Second International Worshop on Feature Interactions in Telecommunication Software Systems, Edited by W. Bouma and H. Velthuijsen, IOS Press, Amsterdam, 1994, pp. 1-23.
A. Felty, K. Namjoshi, Feature specification and automatic conflict detection, in: M. Calder, E. Magill (Eds.), Feature Interactions in Telecommunications and Software Systems, IOS Press, Amsterdam, 2000, pp. 179-192.
P. Gibson, Towards a feature interaction algebra, in: K. Kimbler, L.G. Bouma (Eds.), Feature Interactions in Telecommunications and Software Systems V, IOS Press, Amsterdam, 1998, pp. 217-231.
M. Frappier, A. Mili, J. Desharnais, Detecting feature interactions in relational specifications, in: P. Dini, R. Boutaba, L. Logrippo (Eds.), Feature Interactions in Telecommunication Networks IV, IOS Press, Amsterdam, 1997, pp. 123-137.
X. Wu, H. Schulzrinne, Handling Feature Interactions in the language for End System Services, Computer Networks 51(2), 515-535, 2007.
M. Kolberg and E.H. Magill. Managing Feature Interactions between Distributed SIP Call Control Services, *Computer Networks J.*, Elsevier Science, vol. 51, Issue 2, Feb. 7, 2007, pp. 536-557.
S. Vijaykar, M. Kadavasai, K. Dhara, and V. Krishnaswamy. Virtual Worlds as a Tool for Enterprise Services. IEEE Consumer Communication and Networking Conference, Las Vegas. Jan. 2009.
X Wu, J. Buford, K. Dhara, V. Krishnaswamy, M. Kolberg. Feature Interactions Between Internet Services and Telecommunication Services. IPTComm 2009. Jul. 2009.
M. Roseman, S. Greenberg, TeamRooms: network places collaboration, Proceedings of the 1996 ACM conference on Computer supported cooperative work, p. 325-333, Nov. 16-20, 1996.
Rodden, Tom (1996) Populating the Application: A Model of Awareness for Cooperative Applications. In *Proceedings of the 1966 ACM Conference on Computer-Supported Cooperative Work (CSCW'96 )*.pp. 87-96.
Sara A. Bly. Steve R. Harrison, and Susan Irwin (1993) Media Spaces: Bringing People Together in a Video, Audio, and Computing Environment. *Communications of the ACM* 36 (1), pp. 27-47.
S. Benford, C. Greenhalgh, T. Rodden and J. Pycock. Collaborative virtual environments. *Commun. ACM* 44. 7 (Jul. 2001), 79-85.
X. Wu, V. Krishnaswamy, C. Mohit. Integrating Enterprise Communications into Google Wave. IEEE Consumer Communications and Networking Conference (CCNC 2010). Jan. 2010.
S. Vijaykar, M. Kadavasal, K. Dhara, and V. Krishnaswamy. Virtual Worlds as a Tool for Enterprise Services. IEEE Consumer Communication and Networking Conference, Las Vegas, Jan. 2009.
C. Gutwin, M. Roseman, S. Greenberg. A usability study of awareness widgets in a shared workspace groupware system. Proceedings

(56) References Cited

OTHER PUBLICATIONS of the 1996 ACM conference on Computer supported cooperative work, p. 258-267, Nov. 16-20, 1996, Boston, Massachusetts, United States.
https://datatracker.ietf.org/wg/xcon/charter/ Aug. 29, 2009.
P. Dourish and V. Bellotti. Awareness and Coordination in Shared Workspaces. In CSCW '92 Proceedings of the 1992 ACM conference on Computer-supported cooperative work, p. 107-114, 1992.

* cited by examiner

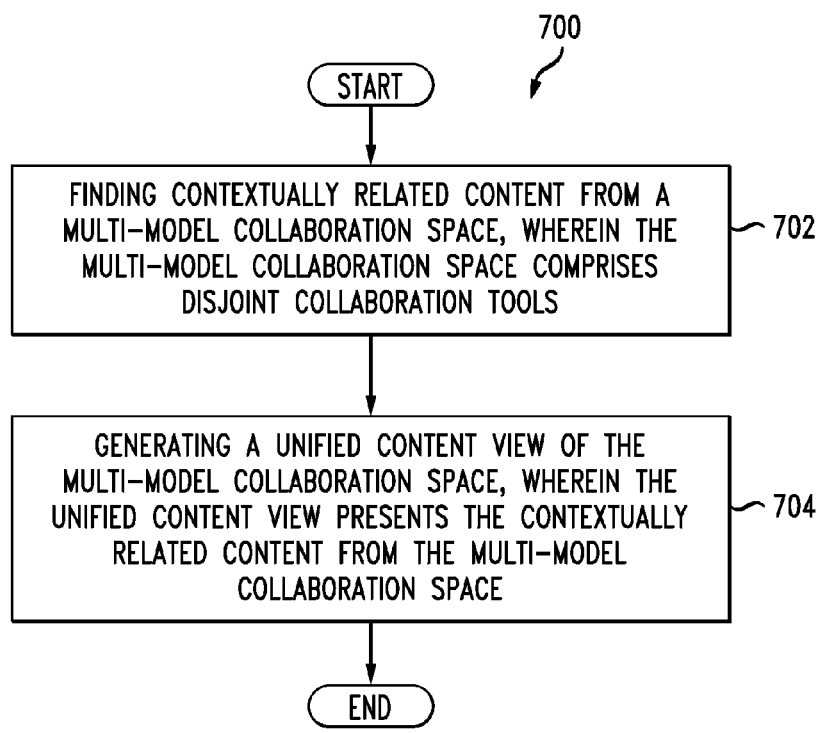

SYSTEM AND METHOD FOR MULTI-MODEL, CONTEXT-AWARE VISUALIZATION, NOTIFICATION, AGGREGATION AND FORMATION

PRIORITY

This application is a continuation-in-part of U.S. patent application Ser. No. 12/848,009, filed Jul. 30, 2010 by the present inventors, entitled "System and Method for Multi-Model, Context-Sensitive, Real-Time Collaboration", which is incorporated by reference.

BACKGROUND

1. Technical Field

The present disclosure relates to multi-model collaboration spaces, and more specifically to context-aware visualization, notification, aggregation, and formation in a multi-model collaboration space.

2. Introduction

Collaboration platforms offer varying frameworks for users to communicate, share information, and work together from virtually anywhere. From wikis and blogs; from email and conferencing; from web-based collaboration systems to 3D collaboration spaces offered by virtual worlds, existing collaboration platforms vary widely in their use and approach for collaboration. Some platforms, such as wikis, blogs, and web-based conferencing systems, are based on the notion that a common space can be accessed through a browser and implemented by users to collaborate. Other platforms, such as Microsoft Groove and SharePoint, are based on the notion that users can collaborate through shared access to a set of files or documents. Here, the collaboration client provides a view of the data for users to work remotely and synchronize their work to a common repository.

Additional collaboration platforms have emerged, such as Google Wave and Thinkature, which offer real-time collaboration tools that allow users to create and manage their own collaboration spaces. The ability to create a collaboration space allows users to tailor collaboration spaces to the needs of a project or particular collaborative effort. The persistence of these spaces further allows users to continue a collaboration in a given space, while also having access to some of the contacts, contents, and tools previously added to the collaboration space.

These approaches, however, are often disjoint and lack integration. They fail to provide meaningful features which are useful, and even required, for enterprise collaboration. Users cannot easily reference activities in a collaboration space with activities in other collaboration spaces, resulting in a limited collaboration experience. These approaches also fail to provide users with real-time, context sensitive views relevant to the collaboration activity, which would greatly enrich the user experience. Other relevant information, such as the history of a collaboration, is typically either not accessible or not easily navigatable and reusable for subsequent relevant collaborations.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be implemented to coordinate contextually relevant content from disjoint collaboration tools and present the relevant content in a visually synchronized way. Collaboration tools provide a shared persistent container in which users can perform collaboration activities. Some examples of collaboration tools include Microsoft Groove and SharePoint, Google Wave, Twitter, Thinkature, Avaya web.alive, email, Instant Messenger, wikis, blogs, conferencing systems, and so forth. The simultaneous use of various collaboration tools can be enhanced by context and semantics information. Moreover, content relevant to a collaboration can be visually organized and presented in a customized manner based on context information. These approaches can thus provide context-aware collaboration and enrich the user's collaboration experience.

Disclosed are systems, methods, and non-transitory computer-readable storage media for context-aware visualization, notification, aggregation, and formation in a multi-model collaboration space. The system first finds contextually related content from a multi-model collaboration space, wherein the multi-model collaboration space includes disjoint collaboration tools. Disjoint collaboration tools can include collaboration tools that are based on different collaboration models and/or provided by different collaboration vendors. For example, disjoint collaboration tools can include various distinct collaboration tools, such as Microsoft Groove and SharePoint, Google Wave, Twitter, Thinkature, Avaya web.alive, email, Instant Messenger, Wikis, blogs, conferencing systems, and so forth. Moreover, the multi-model collaboration space can include multiple collaboration spaces and/or shared resources, objects, entities, templates, collaborations, etc. The contextually related content can include, for example, a message, a document, an appointment, a calendar, a file, a call, a group, a folder, a profile, a webpage, an image, an email, a name, an attachment, a database, a news feed, a conference, a discussion, a history, a report, metadata, audio content, video content, etc. Further, the contextually related content can be from one or more collaboration spaces in the multi-model collaboration space. The contextually related content can also be respective contextually related content from multiple collaboration spaces in the multi-model collaboration space.

The system then generates a unified content view of the multi-model collaboration space, wherein the unified content view presents the contextually related content from the multi-model collaboration space. The system can arrange a plurality of collaboration spaces from the multi-model collaboration space in a visually synchronized manner, and present the contextually related content within each respective collaboration space. Moreover, users can participate in collaboration activities directly from the unified content view. Users can also start, stop, pause, view, and edit collaboration activities directly from the unified content view. For example, a user can initiate a conference call from a collaboration space in the unified content view, while simultaneously browsing contextually related content presented in other collaboration spaces in the unified content view.

The system can generate the unified content view manually, in response to a request, or automatically as a user engages in a collaboration activity and/or accesses content in a collaboration tool. The system can also generate the unified content view in response to a trigger, such as an event, a schedule, an activity, an appointment, an input, a communication, a search, a parameter, a message, a call, and so forth. Moreover, the system can update the contextually related content as the user interacts with the unified content view. In one embodiment, the system dynamically updates the unified content view according to changes in context and/or user interactions. Here, the system can synchronize contextually related content from different collaboration spaces as the context and/or interactions change.

BRIEF DESCRIPTION OF THE DRAWINGS

In order to describe the manner in which the above-recited as well as other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for integrating context processing and multi-model collaboration spaces. A system, method and non-transitory computer-readable media are disclosed which perform context-aware visualization, notification, aggregation, and formation in collaboration environments. First, a brief introductory description of a basic general purpose system or computing device in FIG. 1, which can be employed to practice the concepts, is disclosed herein. The disclosure then turns to a general discussion of collaboration spaces, and the variations of collaboration spaces, including multi-model collaboration spaces, shown in FIGS. 2 and 3. A detailed description of context-aware collaboration views in FIGS. 4-6 will then follow. Finally, the discussion turns to a detailed description of the exemplary method for context-aware visualization of FIG. 7.

Multiple variations shall be discussed herein as the various embodiments are set forth. The disclosure now turns to FIG. 1.

Figure 1:
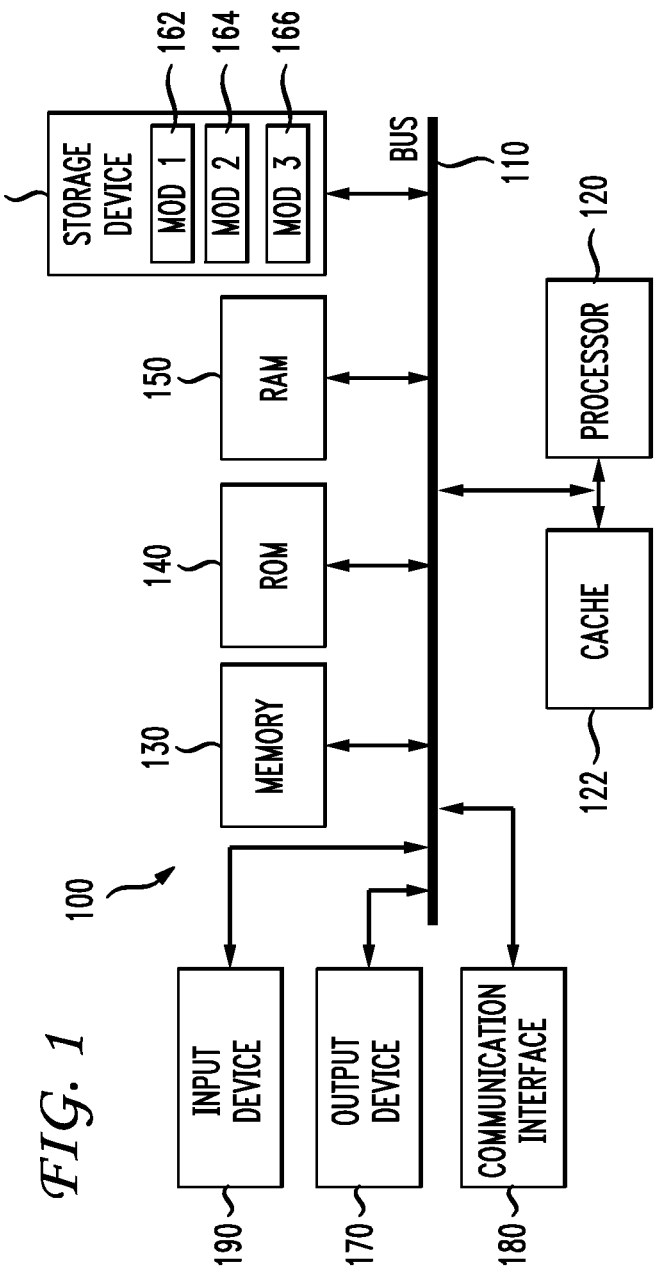
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide non-volatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
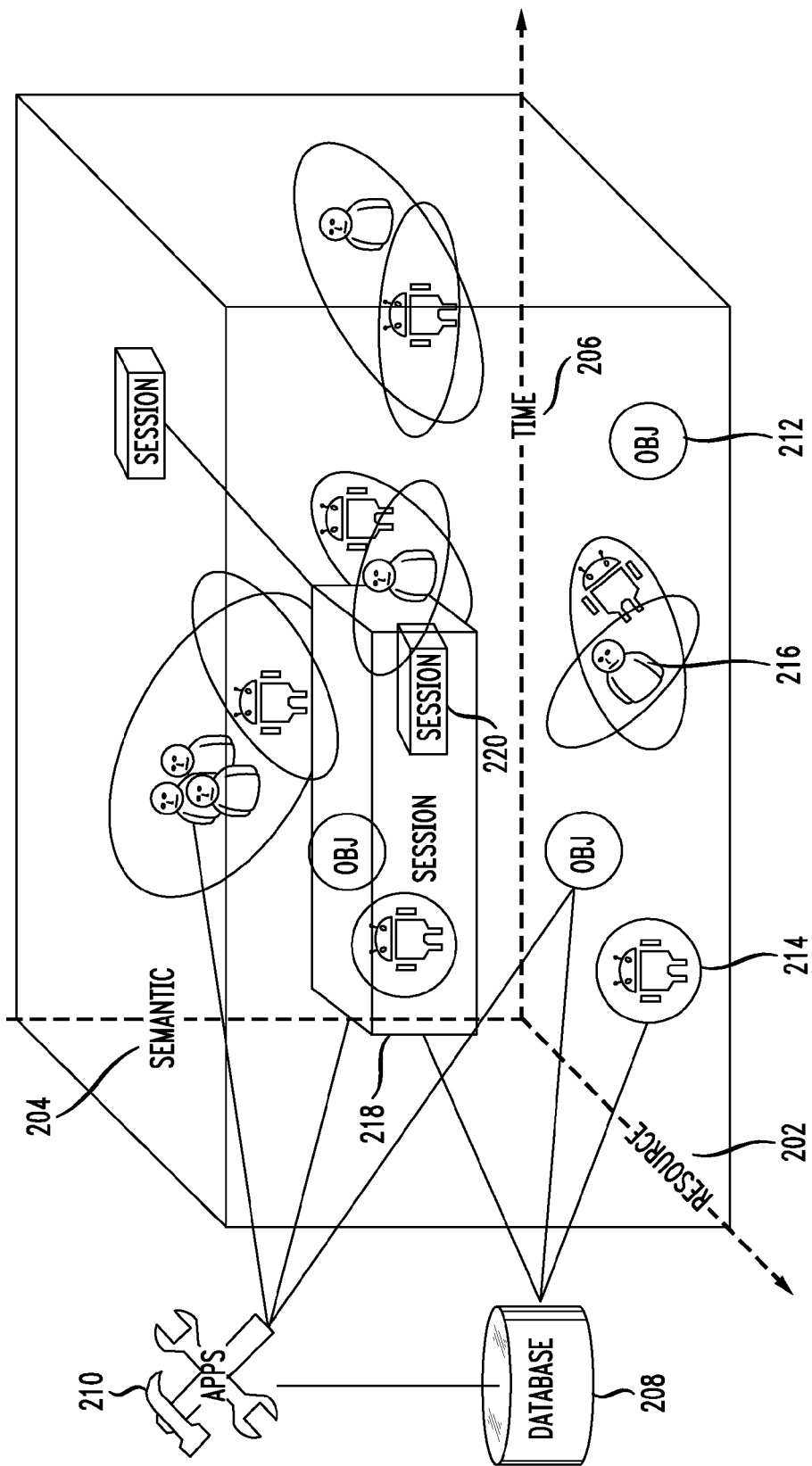
FIG. 2 illustrates an exemplary collaboration space.
Figure 3:
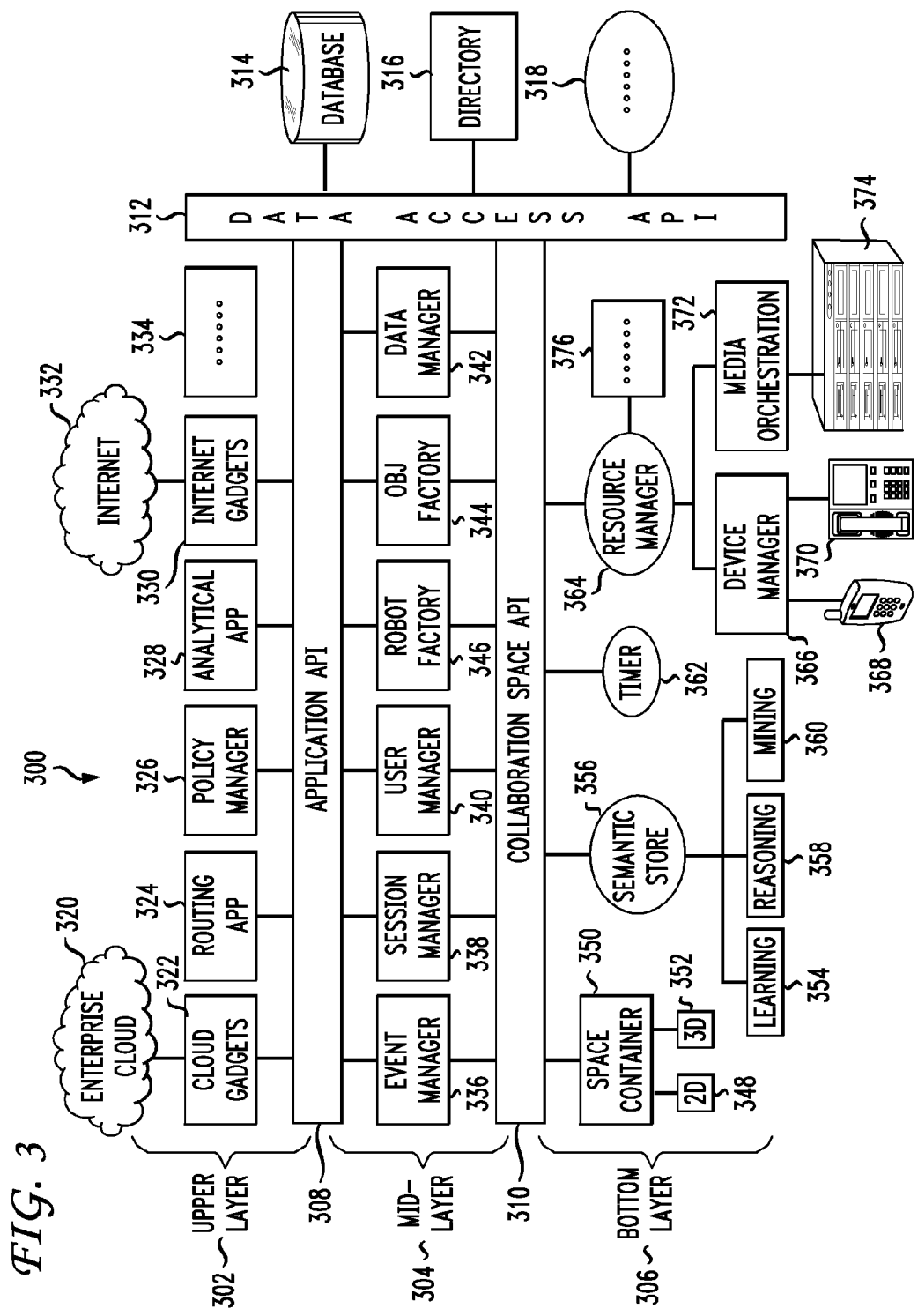
FIG. 3 illustrates a sample multi-model collaboration framework.

Having disclosed some components of a computing system, the disclosure now turns to a general discussion of collaboration spaces, and variations of collaboration spaces, including multi-model collaboration spaces, as shown in FIGS. 2 and 3.

General Discussion of Collaboration Spaces

A space, or collaboration space, provides a shared persistent container in which users perform collaboration activities. Collaboration offers a common workspace with user-specific personal views to a collaboration workspace. The personal views contain materials that assist users in the collaboration space. Google Wave, Instant Messenger, Microsoft SharePoint, and virtual worlds, such as Second Life, are all examples of collaboration spaces. To support collaboration activities, a space includes various resources, such as computation, communication, and storage devices.

A multi-model collaboration space can be a collaboration space shared across multiple models, or capable of being shared across multiple models. For example, a single multi-model collaboration space can include participants using different interaction clients (or models) such as Google Wave, Second Life, Twitter, Microsoft SharePoint, and so on. In one embodiment, a multi-model collaboration space incorporates, or relies on, a translation module that translates information, communication, and client capabilities for participants in the different models.

A view of a shared space can be a user-, group-, or project-specific meta perspective of the collaboration space. A view can be shared, annotated, analyzed, and stored for further retrieval. An entity in a collaboration space can be an agent that can view and modify the space and its attributes. Entities can also be referred to as members of a space. For example, a user can be a human entity, and a contact can be an entity with which a given user may share a space. Moreover, a robot can be a system-owned entity that can automatically perform certain actions in a space. Each entity has a unique identifier. Also, an entity can have an avatar, which represents the entity in a space.

The system and/or users in a space can create an object. An object can be a component embedded in a space that users and robots manipulate or interact with. Objects can include content, gadgets, real-time information sources, other spaces, and/or gateways to components of other collaboration platforms.

A gadget is an object that contains application logic that can affect other entities, or communicates with applications outside of the collaboration space. A collaboration application provides certain functions to manipulate entities in a collaboration space. Also, in an event driven collaboration space, an event can be used to notify an entity about the system and/or other entities' states and activities.

A collaboration space can include one or more sessions. A session can be a collection of collaboration activities among users, robots, and objects. A session spans a certain period of time; contains specific semantic information; and requires resources, such as communication channels, storage, and network bandwidth, to support the collaboration activities. Each session can include session-specific robots and/or objects. For example, a wavebot, which, in Google Wave, refers to an automatic participant on a wave, becomes active only if a user invites it to a session. Further, a robot can be associated with a specific user. One such example is a personal assistant robot, which is associated with a user to help the user manage his or her sessions by preparing documents, automatically creating a session and inviting the user to join, recording the session, and so on.

A template can be implemented as a pre-initialized set of objects that can be inserted into a space to provide a pattern for a particular collaboration activity or group of collaboration activities. A policy can also be implemented as a rule specified by entities managing a space and enforced by the multi-model collaboration framework, to specify constraints on sharing and accessing the space and its objects. However, the collaboration framework can otherwise be open.

Some of the features provided in a collaboration tool include creating a new collaboration space, adding collaboration tools and applications, initiating communication with members of the space or individuals associated with the space, and managing access controls to the collaboration space.

Variations of Collaboration Spaces

The disclosure now turns to FIG. 2, which illustrates an exemplary collaboration space. As shown in FIG. 2, a collaboration space 200 can be represented in three dimensions: resources 202, semantics 204, and time 206. In other embodiments, the collaboration space 200 can also be represented in other ways, such as based on an ontology, for example. Each object 212 in the collaboration space 200 uses some resources, spans a certain period of time (the life cycle of the entity), and has certain semantic properties, which can be pre-defined or dynamically updated. Each space 200 has one or more entities 214, 216 which are members of the collaboration. Each entity has a unique identity. Entities can be organized in groups, and groups can be members of a collaboration space. A collaboration system can mange entity identities. System-owned entities 214 are "collaboration robots"—or simply robots—and other entities 216 can be humans. In the collaboration space 200, a member entity's space can operate on sharable objects 212, such as documents and images. Other resources available to member entities in the collaboration space 200 include applications 210 and databases 208.

Collaboration spaces can also be nested. As shown in FIG. 2, a space 218 can include or refer to another space 220. In one aspect, robots 214 and objects 212 are session specific or owned by a particular session, meaning that the lifecycles of such robots and objects are limited to the scope of their associated session. Robots and objects can also be session independent or associated with a specific user. For example, a user has an assistant robot that helps her manage her sessions by preparing documents, automatically creating a session and inviting the user to join, and recording the session. A collaboration space can contain or nest another collaboration space. Collaboration spaces can be nested at multiple levels. A collaboration space can also link to another collaboration space. Each space or nested sub-space can be individually addressable. A containing collaboration space and a nested collaboration space can be different modalities or environments. In one aspect, users can navigate collaboration spaces via a navigable hypergraph. In another aspect, users can navigate collaboration spaces via a unified content view, as described in FIG. 4 below. In yet another aspect, users can navigate collaboration spaces via context-sensitive views, as further explained below.

Outside of the space, applications can manipulate objects in the space or provide collaboration channels. For example, call routing functions can be considered as collaboration applications. Embedded communications widgets are one example of such an application. In addition, the manipulation of user preferences and policies about appropriate collaboration behavior in a space can also be considered as collaboration applications. The system can save these policies, preferences, and the history of the collaboration activity information in a database 208 for later reuse, or for mining by analytical/reporting functions.

Based on information available in stored or existing spaces, robots can also automatically create new spaces or initiate communication sessions in existing spaces. The system can suggest collaboration spaces or sessions based on topic(s), for example, which relate to content in existing collaboration spaces or based on participant availability. The robot predicts the participants, the gadgets or objects required, and the data required to assemble an initial collaboration session.

A session represents a collection of collaboration activities among users, robots, and objects within a space. A session spans a certain period of time, contains specific semantic information, and requires resources, such as communication channels, storage, and network bandwidth, to support the collaboration activities. Collaboration sessions can provide functionality such as setting up shared sessions, adding collaboration tools, communicating within the space or outside the space, and managing access controls to the collaboration spaces. The term space indicates a collaboration environment with one or more members or a container for collaboration. In various implementations, spaces are known as TeamRooms, shared workspaces, media spaces, waves, or a shared virtual world space that allows participants to interact with each other.

Users and objects can share spaces inter-session. Collaboration spaces can allow objects that communicate with each other during a collaboration session. As an example, consider a collaboration session with a tool (gadget) that handles shared relevant documents. If a new user joins the collaboration space through a communication session, the shared relevant documents gadget automatically updates its content to include documents that relate to the new participant. As discussed above, collaboration spaces can include nested spaces. These nested spaces allow users to focus on a particular issue or permit a sub-session that contains confidential data. The participants in a nested space can be a subset of those participants for the parent space. The nested space has a unique identifier that can be externally referenced, for example, by another space.

In an enterprise, when setting up sharing in collaboration spaces, valuable meeting time can be lost or wasted gathering appropriate content for the shared spaces. Collaborative spaces can persist, thereby allowing instant access to the previously shared content and a set of commonly used tools. A view of a shared space can be a user, group, or project specific metaperspective of the collaboration space. Moreover, the view itself can be shared, annotated, analyzed, and stored for future retrieval. In a collaboration space, the system can instantly bring user specific dynamic context to a collaboration space.

A user-specific view allows an overlay of views to collaboration sessions based on users' personal data, preferences, and context information. An example of such a feature is a gadget or an object in a shared space that presents user specific dynamic data, such as user interactions across enterprise data that is not shared with all participants in the session. This overlay can privately present appropriate information to a user in their active session. User-specific views can be context-sensitive based on a user profile, user device, user location, user permissions, user activities, user communications, user history, user group, user content, and so forth.

Within the collaboration sessions, users can navigate within a gadget or an object to automatically be reflected in other objects. Users can also employ a semantic temporal navigation approach to space history by structure and semantics. For example, users can navigate a space timeline history by participant action, by topic, or by a combination of other navigation criteria. A user can also manage various features of collaboration sessions. Apart from the basic management of starting and ending collaboration spaces, and making a collaboration space persistent, collaboration spaces can provide additional features to assist user interactions with collaborations sessions.

Because collaboration has a structure, the purpose of the collaboration often shapes the structure of the discussion. For example, parties can collaborate for different purposes, such as negotiation, project planning, hiring, investment, and so forth. To this end, a template can include predefined objects, tools, and/or participants designed to support a particular collaboration purpose. Here, when a collaboration is initiated, the creator, another user, or the system can select a template for the new collaboration, thereby saving users time in preparing the space for the intended collaboration. Further, users can save a session and/or space template for future use. For example, a user can save a current collaboration session as a "department collaboration session," which the user can then use in the future for relevant collaboration sessions. The stored template understands the participants, their capabilities, their context, and starts up a collaboration session with the appropriate collaboration space, gadgets, views, content, and so forth.

The disclosure now turns to FIG. 3, which illustrates a sample multi-model collaboration framework 300. The framework 300 is an architectural organization of the collaboration semantics that can be implemented in software, hardware, or a combination thereof. The framework 300 allows unified user access to different types of collaboration spaces mediated by different servers. The framework 300 includes three layers: a bottom layer 306, a middle layer 304 and an upper layer 302. The bottom layer 306 manages the three dimensions of the collaboration space, the middle layer 304 manages the entities in the collaboration space, and the upper layer 302 is a collection of collaboration applications. All three layers can access data entries 314, 316, 318 through the data access API 312.

In the bottom layer 306, the semantic store 356 manages information mined from persistent and/or stored collaboration data, such as keywords extracted from users' emails and conversation tags. The semantic store 356 handles tasks such as learning 354, reasoning 358, and mining 360. The timer 362 manages timestamps and can generate timeout events. The resource manager 364 controls, via a device manager 366, multiple end-user communication devices 368, 370; orchestrates 372 one or more media servers 374; and otherwise manages additional resources 376. The space container manager 350 contains helper functions that can manage multiple 2D 348 or 3D 352 collaboration spaces. For example, the framework 300 can embed collaboration spaces of Google Wave and Avaya web.alive together. In this case, the system can translate different collaboration space models to a sharable view.

The bottom layer 306 and the middle layer 304 communicate via a collaborative space API 310. In the middle layer 304, the robot factory 346 handles system-created robots, and the object factory 344 manages the objects in the collaboration space. The user manager 340 handles user registration and manages user profiles. The session manager 338 can create, update, and delete sessions and maintain session information. The event manager 336 and data manager 342 contain helper functions that manage events and session data in the middle layer 304.

The middle layer 304 and the upper layer 302 communicate via an application API 308. The upper layer 302 contains different applications that can manipulate sessions, users, robots, and objects. Some example applications include cloud gadgets 322, a routing application 324, a policy manager 326, an analytical application 328, internet gadgets 330, and others 334. The applications can subscribe to the event manager 336 to get event notification. The applications can also interact with other applications locally or remotely, such as in an enterprise cloud 320 or over the Internet 332. The applications have access, via the data access API 312, to the database 314, a directory 316, and other resources 318.

The framework 300 can be implemented to provide context aware collaboration sessions. Here, the framework 300 can utilize the context that surrounds the collaboration session and any temporal aspects of the collaboration session to enhance the collaboration session. Context can capture key aspects of collaboration sessions, such as the intent of the collaboration, temporal nature of data, content associated with the session, information about participants, topic of communication, information about the devices, information about the communication, and other metadata.

Context aware collaborations also allow applications, such as relevant contacts, to use the context to mine relevant data and generate a user specific view for the session. Such features can enrich the experience of users in a collaboration session. For example, the intent of a participant, a customer, a group, etc., can used as context information for a collaboration session. This collaboration can involve an appropriate customer agent with one or more experts working together to resolve the customer issue, for example.

Collaboration sessions can include groups of users. Here, the capabilities and access controls can be managed as a group. The group can have a separate group view that contains data mined from the group's information and shared among members of the group. The ability to have groups allows collaborations to include a large set of people without requiring all of them to be part of the collaboration space and without managing their individual identities. Alternatively, the members of a group can have individual views that contain information relevant to the respective users and/or the group. Members can also share their individual views with other members of the group.

Context-Aware Collaboration Views

Figure 4:
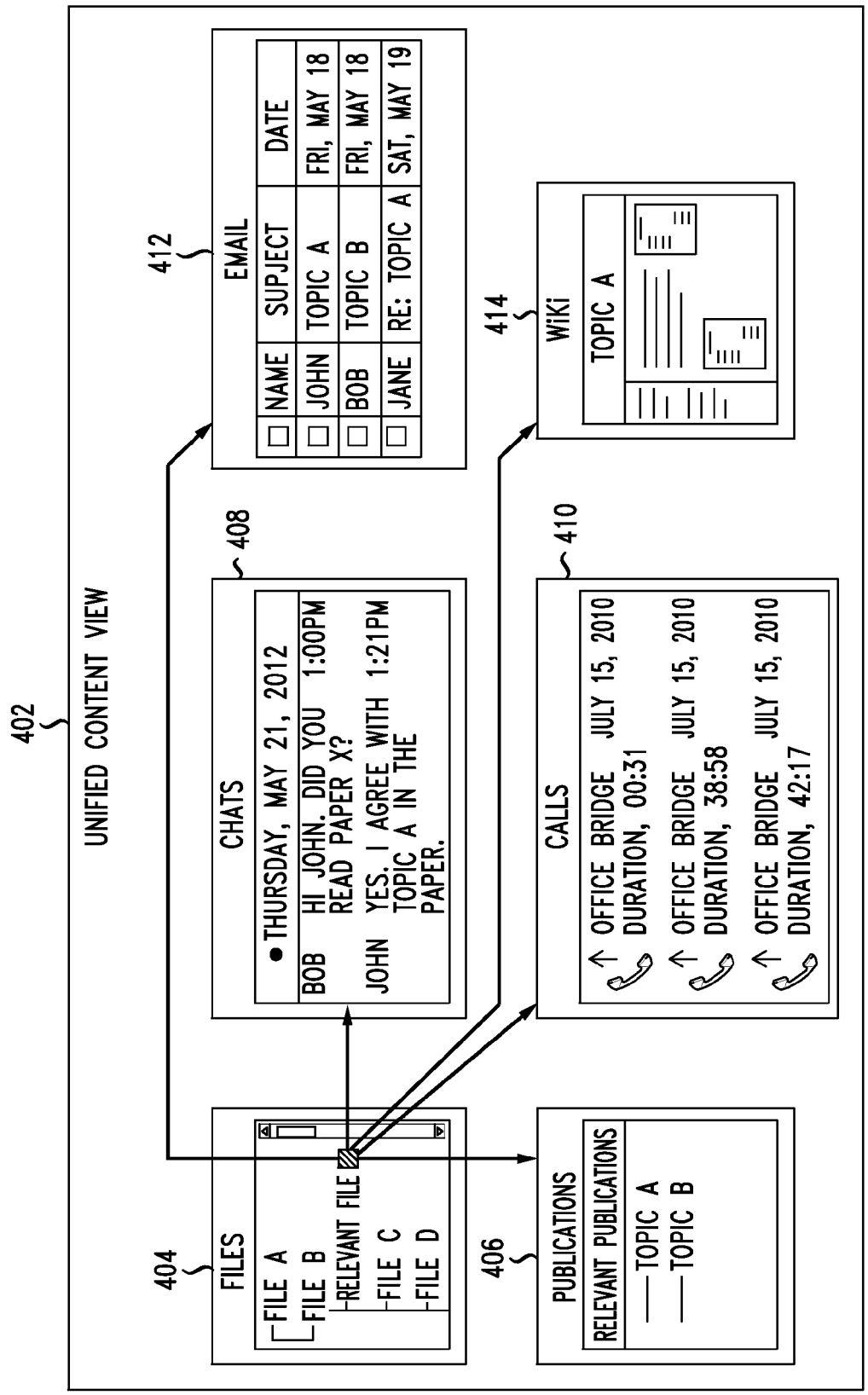
FIG. 4 illustrates an exemplary unified content view of collaboration spaces in a multi-model collaboration framework.
Figure 5:
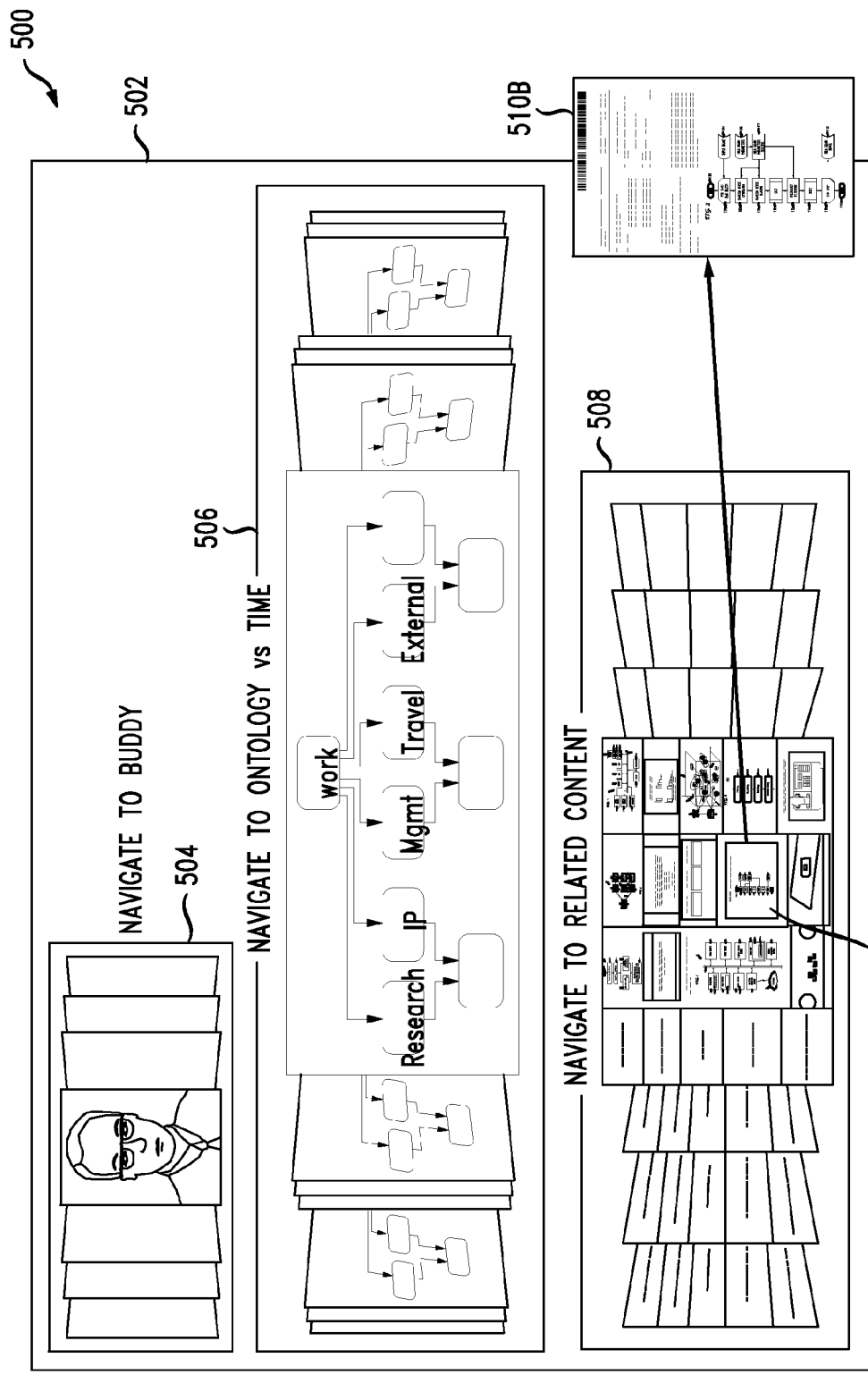
FIG. 5 illustrates an exemplary context-sensitive view of content related to a collaboration.
Figure 6:
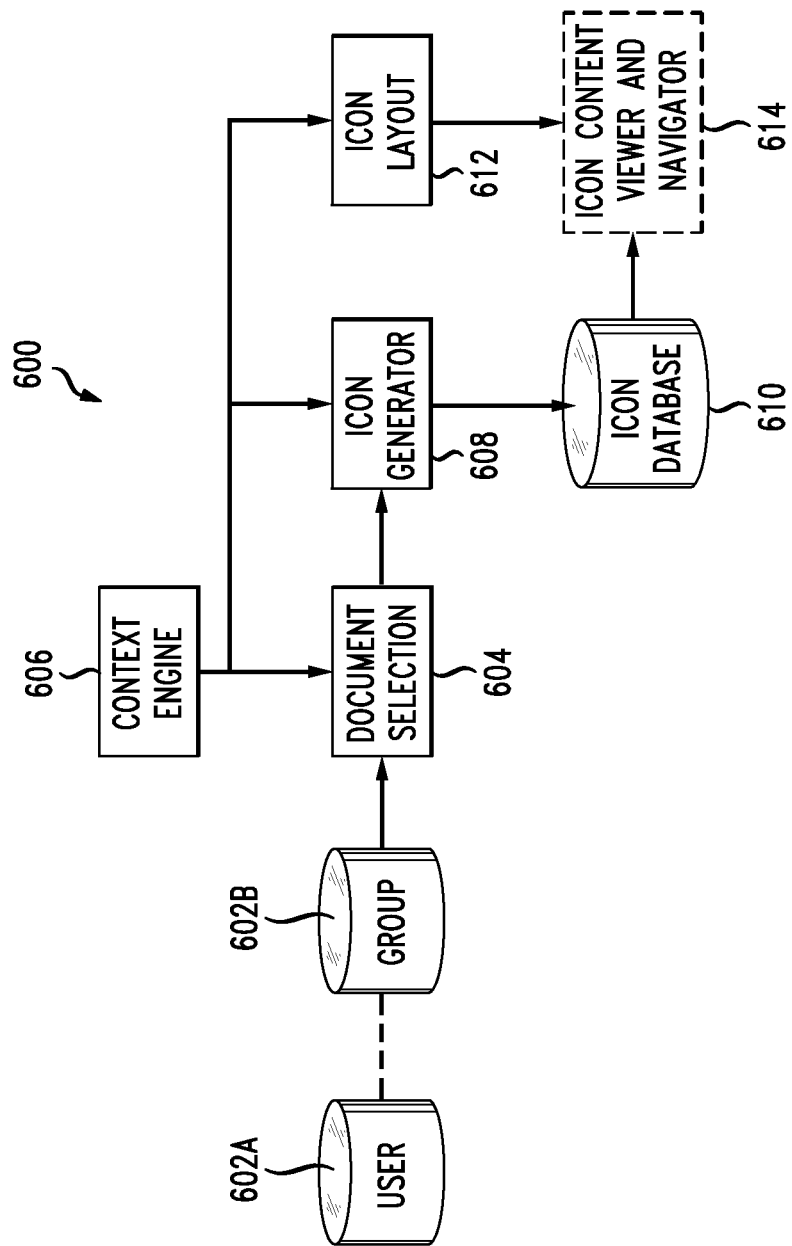
FIG. 6 illustrates an exemplary system for context-sensitive icon selection and content visualization.

The disclosure now turns to a detailed description of context-aware collaboration views in FIGS. 4-6.

FIG. 4 illustrates an exemplary unified content view of collaboration spaces in a multi-model collaboration framework. The unified content view 402 can coordinate simultaneous use of various distinct collaboration tools, such as web-conference, email, Instant Messenger (IM), Microsoft Sharepoint, Avaya web.alive, wiki, etc. To this end, the system can find contextually related content in different collaboration tools, and generate the unified content view 402 by arranging the collaboration tools and/or contextually related content in a visually synchronized manner. The system can also update the unified content view 402 according to changes in context and/or user interactions. The unified content view 402 can be displayed on any device with display capabilities, such as a laptop, a smartphone, a monitor, a television, a conferencing system, a display, a GPS device, a screen, and so forth. The unified content view 402 can also be projected on an object for display. For example, the unified content view 402 can be projected on an object using a video projector.

In FIG. 4, the unified content view 402 includes windows 404-414. The windows 404-414 are arranged in the screen to present contextually related content from different collaboration tools. Each of the windows 404-414 represents a different collaboration tool and presents contextually related content from the respective collaboration tools. Each of the windows 404-414 can also be semantically labeled and connected or associated based on a context. Content in a window can also be linked and/or associated with related content in other windows.

The unified content view 402 integrates the different collaboration tools in windows 404-414 based on context information. This can enhance the collaboration experience of the user. Each of the windows 404-414 presents contextually related content from the respective collaboration tools, and can be independently browsed and searched within the unified content view 402. Users can start, stop, and engage in collaboration activities directly from the unified content view 402. For example, a user can initiate a conference call from window 410, while simultaneously browsing contextually related content presented in windows 404, 406, 408, 412, and 414, and/or engaging in another collaboration activity, such as email.

The contextually related content can include a message, a document, an appointment, a calendar, a file, a call, a group, a folder, a webpage, an image, a name, an attachment, a database, a communication, a news feed, a conference, a discussion, a history, and so forth. The content can be contextually related based on a name, a group, a meeting, a communication, a title, a relationship, an input, a date, a time, an interaction, a location, a membership, an object, a profile, a history, a topic, a schedule, an activity, an appointment, a task, a subject, an address, an association, a label, a device, a flag, a similarity, a threshold, a condition, a meaning, a circumstance, a document, a message, an attachment, a view, a tracking, metadata, semantic information, etc. For example, related communications can be found based on names, addresses, group members, meeting participants, topics, etc. Moreover, files can be associated with a collaborator who has changed, viewed, stored, uploaded, transmitted, and presented the file. Thus, files can be associated with a collaborator based on change tracking, presentations, attachments, uploads, save and view history, etc. This association information can then be used to find related files. Other information such as names, topics, labels, etc., can also be used to find related files.

As shown in FIG. 4, window 404 is a window for browsing files/directories stored at a location, such as a network share or a local filesystem, for example. Window 406 is a collaboration tool for publishing information and sharing documents with other users in an enterprise, such as Microsoft Sharepoint. In this example, window 406 presents documents and published information contextually related to the relevant file in window 404. Window 408 is a chat tool, such as Instant Messenger. Here, window 408 presents chats contextually related to the relevant file in window 404. Further, window 410 is a conferencing tool. As illustrated, window 410 presents calls contextually related to the relevant file in window 404. Also, window 412 is an email tool, and presents emails contextually related to the relevant file in window 404. Finally, window 414 is a wiki contextually related to the relevant file in window 404.

In some aspects, the unified content view 402 can include more or less windows, and the windows can include other collaboration tools, such as Twitter, Google Docs, Google Wave, Avaya web.alive, virtual worlds, Blackboard, project management software, blogs, discussion forums, etc. In other aspects, the unified content view 402 can include images, objects, labels, entities, templates, icons, lists, files, etc., to present the contextually related content from different collaboration tools, with or without using windows.

When generating the unified content view 402, the system can find the contextually related content automatically as a user engages in a collaboration activity and/or accesses content in a collaboration tool. For example, if a user clicks on a file in window 404 titled "Summer Vacation," the system can search different collaboration tools for content that relates to the file and/or the topic summer vacation. The system can then generate a unified content view 402 presenting the relevant content from the different collaboration tools. Thus, the system can present any relevant publication, chat, call, email, and wiki page on windows 406-414, such that the user has access to any content from the different collaboration tools that is related to the "Summer Vacation" and/or the file, as the user accesses the "Summer Vacation" file. The system can also find the contextually related content in response to a trigger, such as a request, an event, a schedule, an activity, an appointment, an input, a communication, a search, a parameter, and so forth. In one embodiment, the system receives user input associated with a collaboration activity and initiates a context aware collaboration activity related to the user input via the unified content view 402.

Moreover, the unified content view 402 can synchronize related content from the different collaboration tools as the context and/or interactions change. For example, the unified content view 402 can present new contextually related emails as the emails are received. The unified content view 402 can additionally present new contextually relevant content obtained from an outside source, such as the Internet. Here, the system can auto-populate a collaboration space with contextually related content from outside sources, such as news sites, RSS feeds, emails, etc. The system and/or the unified content view 402 can also notify a user when relevant items appear in a collaboration space associated with the user.

FIG. 5 illustrates an exemplary context-sensitive view of content related to a collaboration 500. The context-sensitive view 502 organizes content related to a collaboration or communication in a way that is visually navigable, and prioritized in part by context. The context-sensitive view 502 includes pane flippers 504-508 which represent content related to collaborations/communications. The pane flippers 504-508 use icons to represent the content in the pane flippers 504-508. In one aspect, the content is represented using visual mosaic of thumbnails. The icons and the layout of the icons can be selected based on a context. The pane flippers 504-508 can be labeled according to a context, a subject, a preference, an attribute, a topic, a date, a description, a name, a group, etc. For example, rows in a pane can be labeled and ordered based on a combination of context, subject of communication, and user preferences. Different panes can represent a pane history, a user perspective, outside information, etc. The sequencing of panes can be based on context.

In FIG. 5, pane flipper 504 represents individuals associated with a collaboration. In another aspect, pane flipper 504 represents locations, entities, and/or devices associated with the collaboration. The pane flipper 504 includes context-sensitive icons, which represent the content in the pane flipper 504. For example, a context-sensitive icon can be an image of the individual represented by the icon. A user can navigate to an individual by rotating the icons in the pane flipper 504 and selecting the context-sensitive icon associated with the individual. The pane flipper 504 can rotate in any direction to allow users to navigate content. For example, the pane flipper 504 can rotate in a circular manner similar to a carousel.

The pane flipper 506 provides an ontological and temporal view of the content. Users can navigate the pane flipper 506 to view ontological information for a specific time. The pane flipper 506 can include tasks, dates, topic ontologies, etc. Content in the pane flipper 506 can be semantically labeled and/or represented by context-sensitive icons or figures. The pane flipper 508 represents contextually related content. The pane flipper 508 includes rows, which are labeled according to a context, a subject, a preference, an attribute, a date, a topic, a name, and/or a description. The pane flipper 508 also includes context-sensitive icons which represent the content in the pane flipper 508. The icons and the layout of the icons in a pane can be based on context.

Users can navigate the pane flipper 508 and access content by selecting the context-sensitive icon associated with the desired content. For example, a user can navigate the pane flipper 508 and select icon 510A to access the content associated with icon 510A. When the user selects the icon 510A, the context-sensitive view 502 presents the content 510B associated with the icon 510A. Moreover, users can navigate the pane flipper 508 by rotating the panes as necessary. The panes can represent different dates, different perspectives, different versions, different attributes, and different views, for example.

FIG. 6 illustrates an exemplary system 600 for context-sensitive icon selection and content visualization. The system 600 includes a user database 602A and a group database 602B. The user database 602A can include user documents, communications, web history, search history, live feeds, databases, preferences, etc. The group database 602B can similarly include group documents, communications, web history, search history, live feeds, databases, preferences, and so forth. In another aspect, the system 600 includes a single database with user and/or group information.

The system 600 first selects content from the databases 602A-B using a document selection module 604. The databases 602A-B can be on the system 600 or another device. The document selection module 604 communicates with a context engine 606 to select the content from the databases 602A-B based on context information. The context engine 606 can be, for example, a context-processing engine which analyzes a user's communication context, social context, and/or task context. The context engine 606 can implement machine learning and natural language processing methods in order to extract context information.

Based on the context information from the context engine 606, the icon generator 608 then generates an icon for the selected content, and stores the icon in an icon database 610. The icon database 610 can be a local or remote database. The icon layout module 612 also generates an icon layout based on the context information from the context engine 606. The icon layout module 612 can also generate the icon layout based on device attributes, user preferences, group preferences, software restrictions, content characteristics, icon information, presentation information, etc. Finally, the system 600 generates the iconic content viewer and navigator 614 based on the icon layout and one or more icons from the icon database 610.

Exemplary Method for Context-Aware Visualization

Having disclosed some basic system components and concepts, the disclosure now turns to the exemplary method embodiment 700 shown in FIG. 7. For the sake of clarity, the method is discussed in terms of an exemplary system 100, as shown in FIG. 1, configured to practice the method. The steps outlined herein are exemplary and can be implemented in any combination thereof, including combinations that exclude, add, or modify certain steps.

The system 100 first finds contextually related content from a multi-model collaboration space, wherein the multi-model collaboration space includes disjoint collaboration tools (702). The multi-model collaboration space can include various distinct collaboration tools, such as web conferences, email, chat, Microsoft Sharepoint, Avaya web.alive, wikis, Blackboard, Twitter, blogs, Google Wave, Google Docs, peer-to-peer collaboration applications, desktop sharing applications, videoconferencing, data conferencing, whiteboarding, and so forth. The multi-model collaboration space can also include multiple collaboration spaces and/or shared resources, objects, entities, templates, collaborations, etc. Moreover, the multi-model collaboration space can be represented with a resource dimension, a time dimension, and a semantic dimension, for example. In one aspect, the multi-model collaboration space is based on the multi-model collaboration framework 300 illustrated in FIG. 3.

The contextually related content can include, for example, a message, a note, a document, an appointment, a calendar, a file, a call and/or call details, a group, a folder, a webpage, session information, a link, a chat, a post, a video, an audio, a profile, an image, a name, an attachment, a database, a collaboration, a news feed, a conference, a discussion, a history, and so forth. The content can be contextually related based on semantic information, a name, a group, a meeting, a communication, a title, an association, an input, a date, a time, an interaction, a location, a membership, an object, a profile, a history, a topic, a schedule, an activity, an appointment, a task, a subject, an address, a label, a device, a flag, a similarity, a threshold, a condition, a meaning, a circumstance, a document, a perspective, a message, an attachment, a view, a tracking, metadata, a parameter, a content, etc. For example, related communications can be found based on names, addresses, subjects, group members, meeting participants, topics, and the like. Further, the content can be contextually related content from one or more collaboration spaces in the multi-model collaboration space. The content can also be respective contextually related content from multiple collaboration spaces in the multi-model collaboration space.

Content in a collaboration can be associated with the collaboration, and information about the collaboration can then be used to determine if the content is contextually relevant. Also, content in a collaboration can be associated with a collaborator who has changed, viewed, stored, uploaded, transmitted, received, and presented the content. Thus, content can be associated with a collaborator based on change tracking, presentations, attachments, uploads, save and view history, and so forth. This way, information about the collaborator, such as the identity of the collaborator, can be used to determine if the content in the collaboration is contextually relevant. For example, an email attachment can be associated with a user who sent and/or received the email containing the attachment. The identity of the user can then be used to determine if the email attachment is contextually relevant.

Next, the system 100 generates a unified content view of the multi-model collaboration space, wherein the unified content view presents the contextually related content from the multi-model collaboration space (704). The system 100 can arrange a plurality of collaboration spaces from the multi-model collaboration space in a visually synchronized manner, and present the contextually related content within each respective collaboration space. The unified content view can also present contextually relevant content obtained from an outside source, such as the Internet. For example, the system 100 can auto-populate collaboration spaces in the unified content view with contextually related content from outside sources, such as news sites, RSS feeds, search engines, external emails, and so forth.

In one embodiment, the system 100 presents a view containing windows, each window representing a respective collaboration space from the multi-model collaboration space. The windows can be semantically labeled and linked/associated based on a context. Each window includes contextually related content from each respective collaboration space. For example, the unified content view can include a window representing an email application, and the window can include the contextually relevant emails from the email application. The windows can be arranged manually and/or automatically based on a setting, for example. The windows can be independently browsed and/or searched. Further, the content in the windows can be manually and/or automatically expanded, minimized, arranged, filtered, labeled, linked, etc.

In another embodiment, the unified content view presents content associated with a collaboration in a pane flipper with icons representing associated documents. In this example, the icons are selected based on a context. The pane flipper can include rows that are labeled according to a context, a subject, a preference, and/or an attribute. The panes in the pane flipper can represent different dates, different perspectives, different versions, different attributes, different views, etc.

Furthermore, users can interact with the unified content view. In one aspect, users can start, stop, and engage in collaboration activities directly from the unified content view. For example, a user can initiate a conference call from a collaboration space in the unified content view, while simultaneously browsing contextually related content presented in other collaboration spaces in the unified content view. The user can also engage in multiple, simultaneous collaboration activities, such as email, conferencing, chatting, blogging, etc. In one embodiment, the system 100 receives user input associated with a collaboration activity and initiates a context aware collaboration activity related to the user input via the unified content view.

The system 100 can generate the unified content view manually, in response to a request, or automatically as a user engages in a collaboration activity and/or accesses content in a collaboration tool. For example, if Jane opens an email from Bob, the system 100 can automatically generate a unified content view including calls, chats, files, emails, appointments, web pages, notes, messages, and/or any other content from the collaboration spaces that is contextually related to the email from Bob. As Jane reads the email from Bob, Jane can browse, search, save, send, delete, and edit the contextually related content from the other collaboration spaces. Also, Jane can simultaneously initiate a new collaboration, such as a conference, from the unified content view. Jane can thus engage in a collaboration activity and maintain access to contextually related content throughout the collaboration activity. Accordingly, if during a call, Bob asks Jane to refer to a relevant presentation from a previous collaboration, Jane can quickly access the presentation from the unified content view, as the unified content view will present the contextually related content, including the presentation.

The system 100 can also generate the unified content view in response to a trigger, such as an event, a schedule, an activity, an appointment, an input, a communication, a search, a parameter, a message, a call, and so forth. Moreover, the system 100 can update the contextually related content as the user interacts with the unified content view. In one embodiment, the system 100 dynamically updates the unified content view according to changes in context and/or user interactions. Here, the system 100 can synchronize contextually related content from different collaboration spaces as the context and/or interactions change. For example, when a user initiates a call, the system 100 updates the unified content view to present contextually related content relevant to the current call. As another example, the system 100 can update the unified content view to include contextually relevant emails, as relevant emails are sent and/or received. The system 100 can also notify a user when relevant items appear in a collaboration space associated with the user and/or a current activity.

The unified content view can be displayed on any device with display capabilities, such as a laptop, a smartphone, a monitor, a television, a conferencing system, a display, a GPS device, a screen, and so forth. The unified content view can also be projected on an object for display. For example, the unified content view can be projected on an object using a video projector.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to virtually any collaboration space in any collaboration framework. Those skilled in the art will readily recognize various modifications and changes that may be made to the principles described herein without following the example embodiments and applications illustrated and described herein, and without departing from the spirit and scope of the disclosure.

We claim:

1. A method comprising:
    detecting, by a processor, a user interaction with a first collaboration tool of a multi-model collaboration space, wherein the user interaction comprises at least one of engaging in a collaboration activity associated with the first collaboration tool or accessing a first item of content in the first collaboration tool;
    in response to the user interaction, identifying, by the processor, a second item of content from a second collaboration tool of the multi-model collaboration space, wherein the second item of content is contextually related to at least one of the collaboration activity or the first item of content in the first collaboration tool; and
    generating, by the processor, a unified content view of the multi-model collaboration space automatically in response to the user interaction, the unified content view comprising a first interactive interface of the first collaboration tool and a second interactive interface of the second collaboration tool, the second interactive interface presenting the second item of content associated with the second collaboration tool, wherein the second interactive interface integrates a functionality of the second collaboration tool such that a user can establish in an electronic collaborative activity directly via the second interactive interface, wherein the first interactive interface and the second interactive interface are separately arranged from each other in the unified content view, wherein the unified content view of the multi-model collaboration space is also visually represented in three dimensions, the three dimensions comprising a resource dimension, a time dimension, and a semantic dimension, and wherein the three dimensional unified content view of the multi-model collaboration space is nested to comprise a second three dimensional multi-modal collaboration space.

2. The method of claim 1, further comprising:
    receiving user input associated with a collaboration activity, the user input being received via the first interactive interface; and
    initiating a context aware collaboration activity via the unified content view, wherein the context aware collaboration activity is associated with the collaboration activity.

3. The method of claim 1, wherein the second item of content comprises one of a message, a document, an appointment, a calendar, a call, a group, a folder, a webpage, a database, a communication, a news feed, or a conference.

4. The method of claim 1, wherein the multi-model collaboration space comprises a plurality of collaboration spaces, wherein each of the plurality of collaboration spaces can be independently browsed and searched within the unified content view, and wherein the unified content view presents respective contextually related content from each respective collaboration space from the plurality of collaboration spaces.

5. The method of claim 1, wherein generating the unified content view comprises visually arranging a plurality of collaboration spaces from the multi-model collaboration space and presenting respective contextually related content from each respective collaboration space of the plurality of collaboration spaces.

6. The method of claim 1, wherein identifying the second item is further triggered by at least one of a request, an event, a schedule, an activity, an input, a communication, or a parameter.

7. The method of claim 1, wherein identifying the second item comprises searching the multi-model collaboration space for content based on a name, a group, a meeting, a communication, a title, a relationship, an input, a date, a time, an interaction, a location, a participation, a membership, an object, a document, a message, an attachment, a view, or a tracking.

8. The method of claim 1, further comprising notifying the user of an item appearing in the multi-model collaboration space, wherein the item is associated with a current activity.

9. The method of claim 1, further comprising adding new contextually relevant content to a collaboration space in the multi-model collaboration space based on a user context, wherein the new contextually relevant content is from an outside source.

10. The method of claim 1, wherein the first interactive interface and the second interactive interface respectively integrate functionalities of the first collaboration tool and the second collaboration tool such that the user can initiate functionalities of the first collaboration tool and the second collaboration tool respectively from the first interactive interface and the second interactive interface.

11. The method of claim 1, wherein the second three dimensional multi-modal collaboration space refers to a third collaboration space.

12. The method of claim 1, wherein additional separate applications from different vendors are generated in the unified content view of the multi-model collaboration space based on being contextually related to the at least one of the collaboration activity or the first item of content and wherein the first application, the second application, and the additional applications comprise at least the following: a file application, a publication application, a chat application, an voice call application, an email application, and a web application.

13. A system comprising:
    a processor; and
    a computer-readable storage device having stored therein instructions which, when executed by the processor, cause the processor to perform operations comprising:
        detecting a user interaction with a first collaboration tool of a multi-model collaboration space, wherein the user interaction comprises at least one of engaging in a collaboration activity associated with the first collaboration tool or accessing a first item of content in the first collaboration tool;
        in response to the user interaction, identifying a second piece of contextually related content from a second collaboration tool of the multi-model collaboration space, wherein the second item of content is contextually related to at least one of the collaboration activity or the first item of content in the first collaboration tool; and generating a unified content view of the multi-model collaboration space automatically in response to the user interaction, the unified content view comprising a first interactive interface of the first collaboration tool and a second interactive interface of the second collaboration tool, the second interactive interface presenting the second item of content associated with the second collaboration tool, wherein the second interactive interface integrates a functionality of the second collaboration tool such that a user can establish in an electronic collaborative activity directly via the second interactive interface, wherein the first window and the second window are separately arranged from each other in the unified content view, wherein the unified content view of the multi-model collaboration space is also visually represented in three dimensions, the three dimensions comprising a resource dimension, a time dimension, and a semantic dimension, and wherein the three dimensional unified content view of the multi-model collaboration space is nested to comprise a second three dimensional multi-modal collaboration space.

14. The system of claim 13, wherein generating the unified content view comprises updating a previous unified content view.

15. The system of claim 13, wherein the instructions cause the processor to:
receive user input associated with a collaboration activity, the user input being received via the first interactive interface; and
initiate a context aware collaboration activity via the unified content view, wherein the context aware collaboration activity is associated with the collaboration activity.

16. The system of claim 13, wherein the second item of content comprises one of a message, a document, an appointment, a calendar, a call, a group, a folder, a webpage, a database, a communication, a news feed, or a conference.

17. The system of claim 13, wherein the multi-model collaboration space comprises a plurality of collaboration spaces, wherein each of the plurality of collaboration spaces can be independently browsed and searched within the unified content view, and wherein the unified content view presents respective contextually related content from each respective collaboration space from the plurality of collaboration spaces.

18. The system of claim 13, wherein generating the unified content view comprises visually arranging a plurality of collaboration spaces from the multi-model collaboration space and presenting respective contextually related content from each respective collaboration space of the plurality of collaboration spaces.

19. The system of claim 13, wherein identifying the second item is further triggered by at least one of a request, an event, a schedule, an activity, an input, a communication, or a parameter.

20. The system of claim 13, wherein identifying the second item comprises searching the multi-model collaboration space for content based on a name, a group, a meeting, a communication, a title, a relationship, an input, a date, a time, an interaction, a location, a participation, a membership, an object, a document, a message, an attachment, a view, or a tracking.

* * * * *